US010220622B2

(12) United States Patent
Otokita et al.

(10) Patent No.: US 10,220,622 B2
(45) Date of Patent: Mar. 5, 2019

(54) LIQUID EJECTING APPARATUS (71) Applicant: SEIKO EPSON CORPORATION, Tokyo (JP)

(72) Inventors: Kenji Otokita, Yamagata (JP); Seiji Ihara, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/922,450

(22) Filed: Mar. 15, 2018

(65) Prior Publication Data
US 2018/0272713 A1 Sep. 27, 2018

(30) Foreign Application Priority Data

Mar. 24, 2017 (JP) ................. 2017-058631

(51) Int. Cl.
| B41J 2/165 | (2006.01) |
| B41J 2/125 | (2006.01) |
| B41J 19/18 | (2006.01) |
| B41J 11/42 | (2006.01) |
| G06K 15/16 | (2006.01) |
| B41J 29/38 | (2006.01) |
| B41J 13/00 | (2006.01) |
| B65H 7/02 | (2006.01) |
| B41J 25/308 | (2006.01) |

(52) U.S. Cl.
CPC ............... *B41J 2/165* (2013.01); *B41J 2/125* (2013.01); *B41J 11/42* (2013.01); *B41J 13/0018* (2013.01); *B41J 19/18* (2013.01); *B41J 25/308* (2013.01); *B41J 29/38* (2013.01); *B65H 7/02* (2013.01); *G06K 15/16* (2013.01)

(58) Field of Classification Search
CPC ........ B41J 11/42; B41J 13/0018; B41J 19/18; B41J 25/308; B41J 29/38; B41J 2/125; B41J 2/165; B41J 29/393; B65H 7/02; G06K 15/16

See application file for complete search history.

(56) References Cited

U.S. PATENT DOCUMENTS

2010/0220130 A1*  9/2010  Bruno .............. B41J 2/16517
                                                  347/9
2016/0236475 A1*  8/2016  Toyama ............... B41J 2/165

FOREIGN PATENT DOCUMENTS

JP          2013-035184 A      2/2013

* cited by examiner

*Primary Examiner* — Jannelle M Lebron
(74) *Attorney, Agent, or Firm* — Workman Nydegger (57) ABSTRACT A plate-like detection plate portion that undergoes strain due to contact with an object is used for detecting the presence of an object that can come into contact with a liquid ejecting unit with relative movement between a medium and the liquid ejecting unit, and is provided with a piezoelectric film sensor that outputs an electric signal corresponding to strain of the detection plate portion. The piezoelectric film sensor includes a detection film portion in which a piezoelectric element that causes a voltage change corresponding to the strain is arranged, and an output circuit portion that converts the voltage change of the detection film portion into an electric signal and outputs the electric signal. The output circuit portion is provided on a second plate surface, which is a rear surface of a first plate surface facing the medium, of the detection plate portion.

5 Claims, 10 Drawing Sheets

LIQUID EJECTING APPARATUS

BACKGROUND

1. Technical Field

The present invention relates to a liquid ejecting apparatus.

2. Related Art

To date, a liquid ejecting apparatus that ejects a liquid such as ink onto a medium being transported has been used. In such a liquid ejecting apparatus, the medium may rise up during the transportation process or a foreign object may adhere to the surface of the medium. In the case where the risen medium itself or the foreign object on the surface of the medium comes into contact with a liquid ejecting unit, at least one of the medium and the liquid ejecting unit may become damaged. Accordingly, various techniques have been disclosed for reducing the likelihood of a medium, a foreign object, or the like coming into contact with a liquid ejecting unit.

For example, JP-A-2013-35184 discloses a liquid ejecting apparatus (ink jet recording apparatus) that detects rising of a medium by an optical detection device in order to reduce the likelihood of a medium and a liquid ejecting unit coming into contact with each other. Further, whether there is a foreign object on the surface of the medium can also be detected by the optical detection device proposed in JP-A-2013-35184.

However, while the optical detection device disclosed in JP-A-2013-35184 can detect a foreign object with high accuracy, it is necessary to perform high-precision equipment adjustment such as optical axis adjustment between a light projecting portion on one end side of the medium and a light receiving portion on the other end side of the medium. In addition, various electrical control devices are required for oscillation control of laser light.

SUMMARY

An advantage of some aspects of the invention is that a foreign object detection device which can achieve high accuracy of foreign object detection as much as an optical detection device and which can simplify the adjustment of equipment is provided.

An advantage of some aspects of the invention can be realized as the following aspects.

(1) There is provided a liquid ejecting apparatus according to an aspect of the invention. The liquid ejecting apparatus according to the aspect of the invention includes a liquid ejecting unit that is arranged to face a medium and that ejects a liquid onto the medium, a detection plate portion that is plate shaped and that undergoes strain by coming into contact with an object that can come into contact with the liquid ejecting unit with relative movement between the medium and the liquid ejecting unit, and a piezoelectric film sensor that is provided on the detection plate portion and that outputs an electric signal corresponding to the strain of the detection plate portion. In addition, the piezoelectric film sensor includes a detection film portion in which a piezoelectric element that causes a voltage change corresponding to the strain is arranged, and an output circuit portion that converts the voltage change of the detection film portion into an electric signal and outputs the electric signal. The output circuit portion is provided on a second plate surface of the detection plate portion, the second plate surface being a rear surface of a first plate surface, which faces the medium, of the detection plate portion.

The liquid ejecting apparatus according to this aspect detects a foreign object adhering to the medium surface or a curved medium as follows. If a foreign object is attached to the surface of the medium or the medium itself is curved, the detection plate portion that is plate shaped comes into contact with the foreign object or the curved medium, and the detection plate portion consequently becomes distorted. The strain of the detection plate portion is detected with high sensitivity by the piezoelectric film sensor capable of detecting extremely small strain. Moreover, the object such as a foreign object or a curved medium contacts the first plate surface of the detection plate portion, but does not interfere with the output circuit portion on the second plate surface. As a result, in the liquid ejecting apparatus according to this aspect, in addition to being able to detect a foreign object with high accuracy, it is possible to protect the output circuit portion of the piezoelectric film sensor which is indispensable for outputting electric signals. Further, because the detection film portion, which may come into contact with an object, is located where the piezoelectric element is arranged, it is more resistant to contact with the object than the output circuit portion.

(2) In the liquid ejecting apparatus according to this aspect, the detection film portion may have a voltage change characteristic causing a voltage change to the plus side when a tensile force is applied to the detection film portion, and the detection film portion having the voltage change characteristic may be provided on the first plate surface of the detection plate portion and electrically connected to the output circuit portion on the second plate surface via an opening portion formed in the detection plate portion. With this configuration, there are the following advantages. Due to the contact with an object such as a foreign object attached to the surface of the medium or a curved medium, the detection plate portion is distorted in such a manner that the side of the first plate surface is pulled. Because the detection film portion receives a tensile force that conforms to the voltage change characteristic of the detection film portion, it causes a voltage change with high accuracy. Therefore, in the liquid ejecting apparatus according to this aspect, it is possible to detect a foreign object with higher accuracy.

(3) In the liquid ejecting apparatus according to this aspect, the detection film portion may have a voltage change characteristic causing a voltage change to the plus side when a compressive force is applied to the detection film portion, and the detection film portion having the voltage change characteristic may be provided on the second plate surface of the detection plate portion and electrically connected to the output circuit portion on the second plate surface. With this configuration, there are the following advantages. Due to the contact with an object such as a foreign object attached to the surface of the medium or a curved medium, the detection plate portion is distorted in such a manner that the side of the second plate surface is compressed. Because the detection film portion receives a compressive force that conforms to the voltage change characteristic of the detection film portion, it causes a voltage change with high accuracy. Therefore, in the liquid ejecting apparatus according to this aspect, it is possible to detect a foreign object with higher accuracy. Moreover, like the output circuit portion, the detection film portion on the second plate surface can also be protected.

(4) In the liquid ejecting apparatus according to this aspect, the detection film portion may have a voltage change characteristic causing a voltage change to the minus side when a compressive force is applied to the detection film portion, and the detection film portion having the voltage change characteristic may be provided on the second plate surface of the detection plate portion and electrically connected to the output circuit portion on the second plate surface. With this configuration, as described above, it is possible to detect a foreign object with higher accuracy, and it is possible to protect the detection film portion on the second plate surface as well as the output circuit portion.

(5) In the liquid ejecting apparatus according to this aspect, the detection film portion may be formed in a rectangular shape and may be provided on the detection plate portion so that a longitudinal direction thereof is along a width direction of the medium. In this case, because the area occupied by the detection film portion along the transport direction of the medium is narrowed, the detection plate portion can be reduced in size.

In addition, the invention can be realized in various aspects, for example, it can be realized in the form of an image forming apparatus, a printing apparatus, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
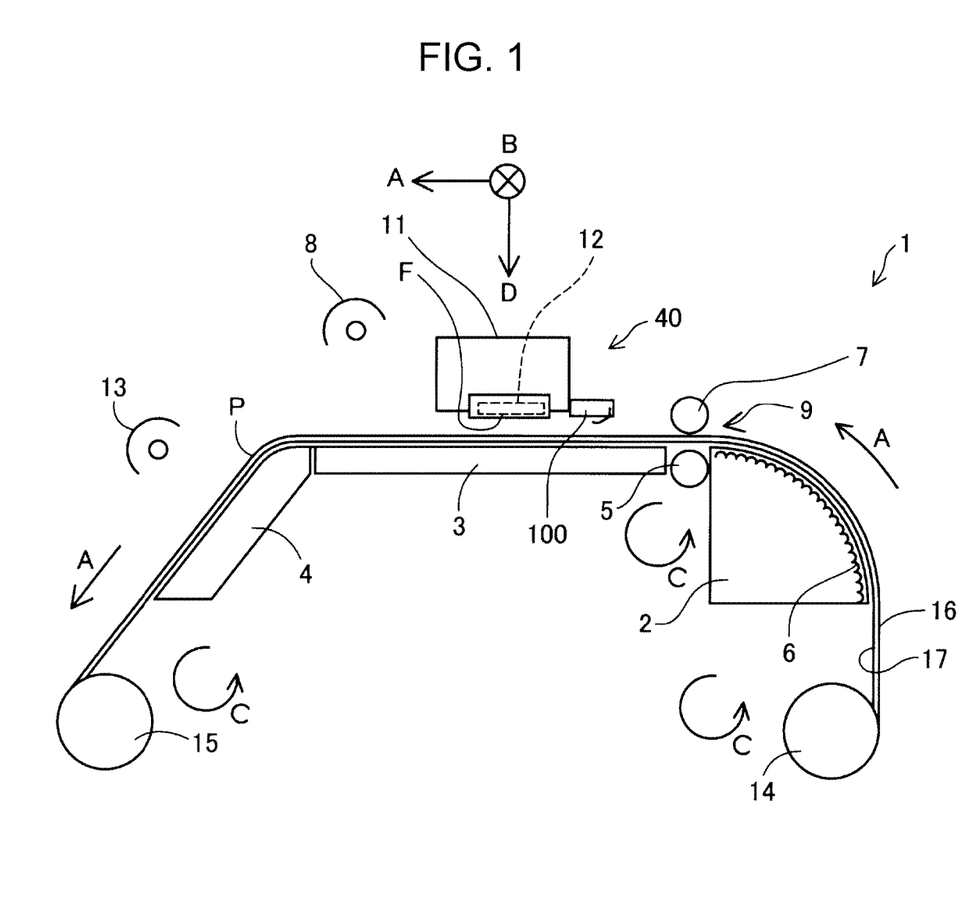
FIG. 1 is a schematic side view illustrating a schematic configuration of a recording apparatus having a liquid ejecting apparatus according to an embodiment of the invention.
Figure 2:
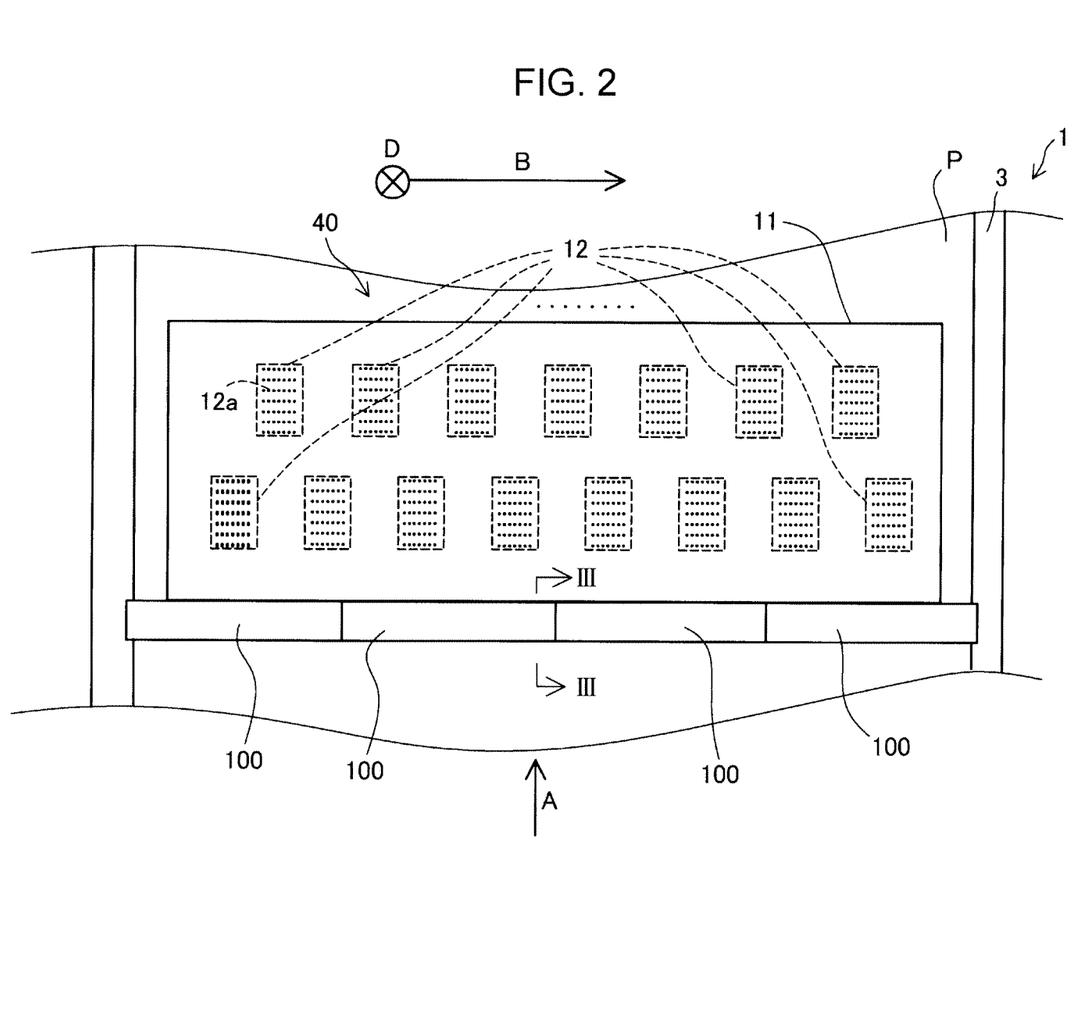
FIG. 2 is a schematic plan view schematically illustrating a peripheral configuration of a carriage included in the liquid ejecting apparatus in plan view.

FIG. 1 is a schematic side view illustrating a schematic configuration of a recording apparatus 1 having a liquid ejecting apparatus 40 according to an embodiment of the invention. FIG. 2 is a schematic plan view schematically illustrating a peripheral configuration of a carriage 11 included in the liquid ejecting apparatus 40 in plan view.

In the recording apparatus 1, a medium P is transported from a setting unit 14 for the medium P to a winding unit 15 for the medium P via a platen 2, a platen 3, and a platen 4 serving as support portions for the medium P, in a transport direction A (a direction from the setting unit 14 toward the winding unit 15). That is, the path from the setting unit 14 to the winding unit 15 is the transport path for the medium P in the recording apparatus 1, and the platen 2, the platen 3 and the platen 4 are support portions that are provided on the transport path and that support the medium P. The setting unit 14 sends out the medium P by rotating in a rotation direction C and the winding unit 15 winds up the medium P by rotating in the rotation direction C.

The recording apparatus 1 has a configuration in which recording can be performed on the medium P in roll form; however, it is not limited to such a configuration and may have a configuration in which recording can be performed on the medium P in single sheet form. In the case of a configuration in which recording can be performed on the medium P in single sheet form, as the setting unit 14 for the medium P, for example, a so-called paper (feed) tray, paper (feed) cassette, or the like may be used. In addition, as a collecting unit for the medium P other than the winding unit 15, for example, a so-called discharge receiving unit, paper ejection (discharge) tray, a paper ejection (discharge) cassette, or the like may be used.

In this embodiment, because the medium P, which is wound up in a roll in such a manner that a recording surface 16 is on the outer side, is used, when sending out the medium P from the setting unit 14, the rotation shaft of the setting unit 14 rotates in the rotation direction C. However, in the case where the medium P, which is wound up in a roll in such a manner that the recording surface 16 is on the inner side, is used, by setting the setting unit 14 to a position that is horizontally mirror-inverted to the position illustrated in FIG. 1, it is possible to send out the target recording medium P by rotating the rotation shaft of the setting unit 14 in a direction opposite to the rotation direction C. Thus, similarly, because the winding unit 15 of this embodiment winds the medium P in such a manner that the recording surface 16 is on the outer side, the rotation shaft of the winding unit 15 rotates in the rotation direction C. However, in the case where the winding is performed in such a manner that the recording surface 16 is on the inner side, by setting the winding unit 15 to a position that is horizontally mirror-inverted to the position illustrated in FIG. 1, it is possible to wind the medium P by rotating the rotation shaft of the winding unit 15 in a direction opposite to the rotation direction C.

The platen 2 of the recording apparatus 1 is provided with a heater 6. The heater 6 is provided in order to heat up (so-called pre-heat) the medium P before recording is performed by a recording head 12 serving as a recording unit. Further, the recording apparatus 1 of this embodiment has a configuration in which the medium P is preheated from a rear surface 17 side, which is on the opposite side to the recording surface 16 of the medium P, by using the heater 6. However, for example, a configuration may be used in which the medium P is preheated from the recording surface 16 side by using a heater that is capable of heating the medium P by irradiating infrared rays from the recording surface 16 side of the medium P.

The recording apparatus 1 is provided with a drive roller 5 that has a rotation shaft extending in an intersecting direction B intersecting the transport direction A between the platen 2 and the platen 3 and that applies a feeding force to the rear surface 17 of the medium P. In addition, a driven roller 7 that has a rotation shaft extending in the intersecting direction B is provided at a position that faces the drive roller 5. The medium P can be interposed between the drive roller 5 and the driven roller 7 that form a roller pair. By adopting such a configuration, a transport section 9 is formed of the drive roller 5 and the driven roller 7. Here, a driven roller refers to a roller that rotates with the transportation of the medium P. In addition, when the target medium P is transported in the transport direction A, the drive roller 5 rotates in the rotation direction C and the driven roller 7 rotates in a direction opposite to the rotation direction C. Because a rotational force is applied as described above and the medium P is taken up and transported from the setting unit 14 to the winding unit 15 via the platens 2 to 4, the setting unit 14, the platens 2 to 4, and the winding unit 15 cooperate with the above-mentioned driving and driven rollers and transport the medium P while supporting the medium P facing the recording head 12.

In addition, the recording apparatus 1 includes the liquid ejecting apparatus 40 on the side facing the platen 3. The liquid ejecting apparatus 40 includes the carriage 11, which is a device casing and houses the recording head 12. The recording head 12 ejects ink, which is an example of a liquid, from a nozzle forming surface F to the medium P in an ejection direction D (in a direction from the nozzle forming surface F to the medium P; in the embodiment, a vertically downward direction) to form an desired image. The recording head 12 has a so-called line head configuration that faces the medium P and in which a plurality of nozzles 12a are provided in the intersecting direction B intersecting with the transport direction A to form nozzle rows, and corresponds to a liquid ejecting unit of this application. Here, the term "line head" refers to a recording head in which a region of nozzle rows formed in the intersecting direction B that intersects the transport direction A of the medium P is provided in such a manner as to be capable of covering substantially the entire region of the medium P in the intersecting direction B, and which is used in a recording apparatus that forms an image by moving a recording head and the medium P relative to each other. In this embodiment, without moving the recording head 12 during ink ejection, the recording head 12 and the medium P are moved relative to each other by moving the medium P in the transport direction A; however, without moving the medium P during ink ejection from the recording head 12, the recording head 12 and the medium P may be moved relative to each other by ejecting ink while moving the recording head 12 from the downstream side to the upstream side in the transport direction A. In addition, the recording head 12 is not limited to a line head, but may be a serial head that performs printing in a recording area by moving the recording head in the transport direction A or the intersecting direction B a plurality of times. FIG. 2 illustrates the liquid ejecting apparatus 40 of the recording apparatus 1 in the case where the recording head 12 is a serial head and the recording head 12 is moved in the transport direction A, and the plurality of the nozzles 12a are disposed in the intersecting direction B so as to form nozzle rows. The length of the region of the nozzle rows is, generally, formed to be shorter than the length of the medium P in the intersecting direction B, but may be longer than the length of the medium P in the intersecting direction B. In addition, in the case where the recording head 12 is moved in the intersecting direction B, the plurality of nozzles 12a are disposed in the transport direction A and form nozzle rows. The length of the region of the nozzle rows is, generally, formed to be shorter than the length of the recording area of the medium P in the transport direction A, but may be longer than the length of the recording area of the medium P in the transport direction A. In addition, the nozzle rows may be formed by arranging a plurality of the nozzles 12a in a line in a single head regardless of whether the recording head is a line head or a serial head, or, as illustrated in FIG. 2, by arranging a plurality of single heads having nozzle rows so that the nozzle rows partially overlap when viewed from a direction intersecting with the arrangement direction of the nozzles, to form a single nozzle row in a pseudo manner. Further, in the case where the recording head 12 is a serial head, the recording head 12 is moved via the carriage 11, and such carriage driving is performed by a guide rail (not illustrated) and a driving motor (not illustrated) along the scanning direction.

The recording apparatus 1 includes a heater 8 on the downstream side of the recording head 12 in the transport direction A and irradiates the medium P with infrared light from the heater 8 to heat the medium P. The heater 8 is designed to dry the ink by irradiating the infrared light toward the region recorded on by the recording head 12. The heater 8 is provided at a position facing the platen 3 and is an infrared ray heater capable of heating the recording surface 16 side of the medium P; however, the heater 8 is not limited to such a heater and a heater capable of heating the medium P from the platen 3 side (the rear surface 17 side) may be used.

The recording apparatus 1 is provided with a heater 13 capable of irradiating infrared light on the most downstream side in the transport direction A of the medium P. The heater 13 is provided at a position facing the platen 4 and is an infrared ray heater capable of heating the recording surface 16 side of the medium P; however, the heater 13 is not limited to such a heater and a heater capable of heating the medium P from the platen 4 side (the rear surface 17 side) may be used. In addition, for example, instead of a heating device such as an infrared ray heater, a blowing device or the like such as a fan may be used.

In addition, the liquid ejecting apparatus 40 includes a detection unit 100 on the upstream side of the recording head 12 in the transport direction of the medium P. In the case where the recording head 12 is a serial head and the recording head 12 moves in the transport direction A or in the case where the recording head 12 is a line head, a plurality (specifically four units) of detection units 100, as illustrated in FIG. 2, are mounted and fixed in the carriage 11 over the entire width direction (intersecting direction B) of the medium P having the maximum width that the recording apparatus 1 can deal with. In addition, in the case where the recording head 12 is a serial head and the recording head 12 moves in the transport direction A, the four of the detection units 100 may together have about the same width as the carriage 11 and even when the width of the carriage 11 is smaller than the maximum width of the medium P, which the recording apparatus 1 can deal with, in the width direction, because the four of the detection units 100 move in the intersecting direction B together with the carriage 11 in accordance with the line feed operation of the recording head 12 for a plurality of moves, there is no problem with the detection of a foreign object, which will be described later, for the medium P having the maximum width that the recording apparatus 1 can deal with.

Figure 3:
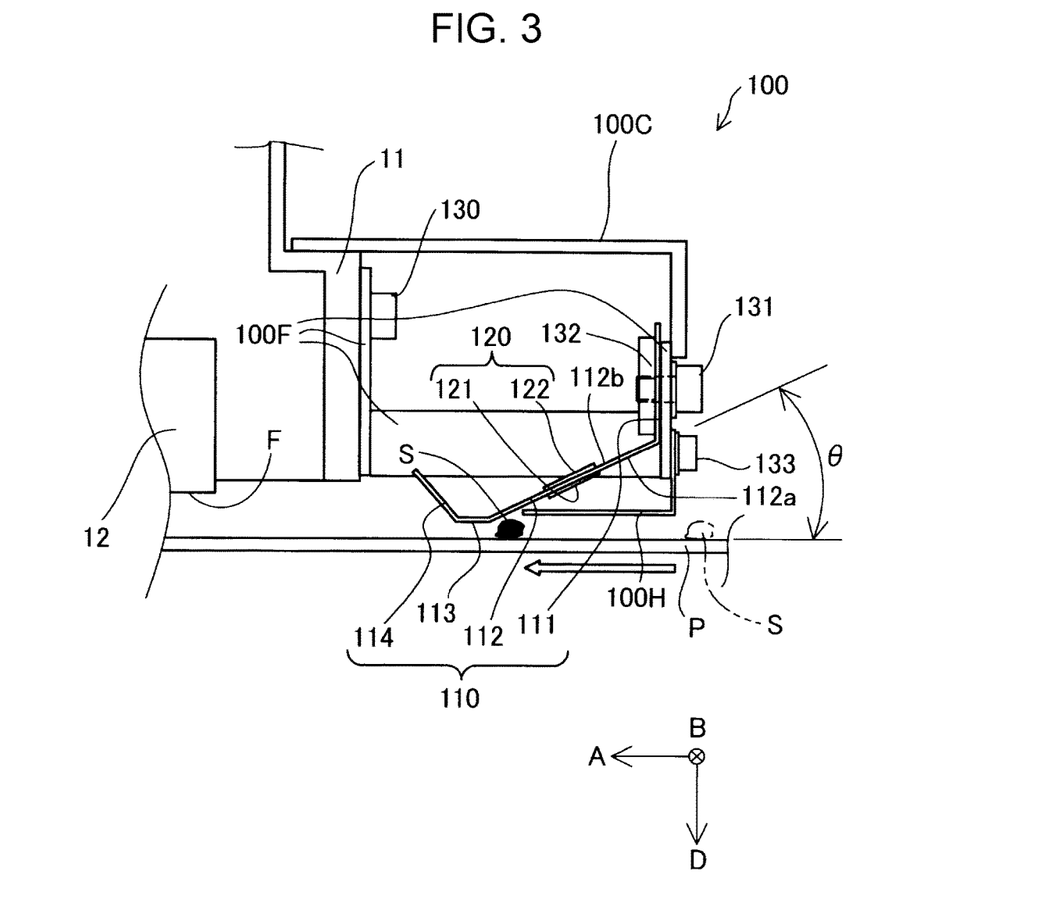
FIG. 3 is an explanatory view illustrating a configuration of a detection unit by sectioning the detection unit along a line III-III of FIG. 2.
Figure 4:
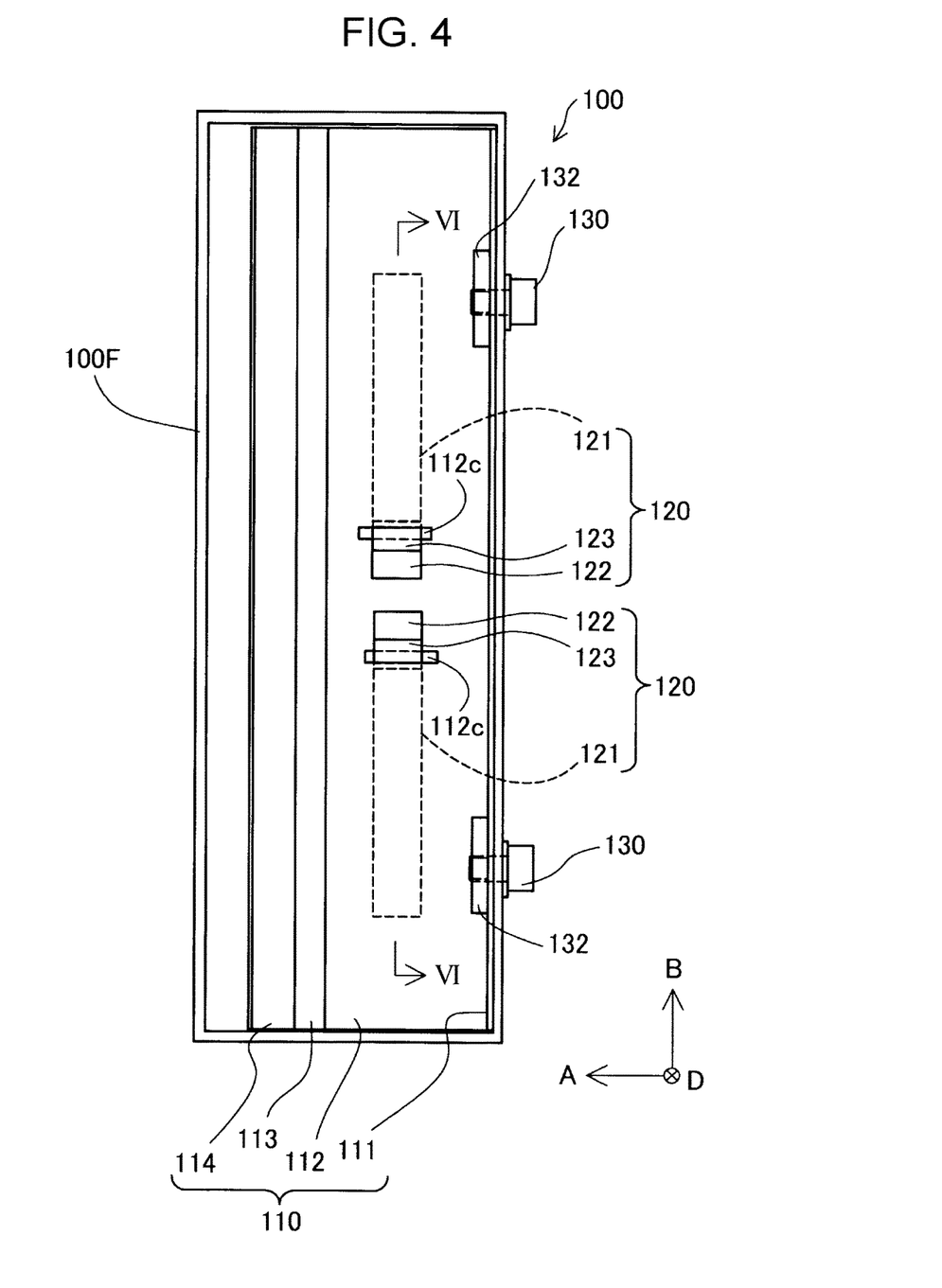
FIG. 4 is an explanatory view illustrating a configuration of a detection unit in an ejection direction in a plan view of the detection unit in a direction from an upper cover to a platen.
Figure 5:
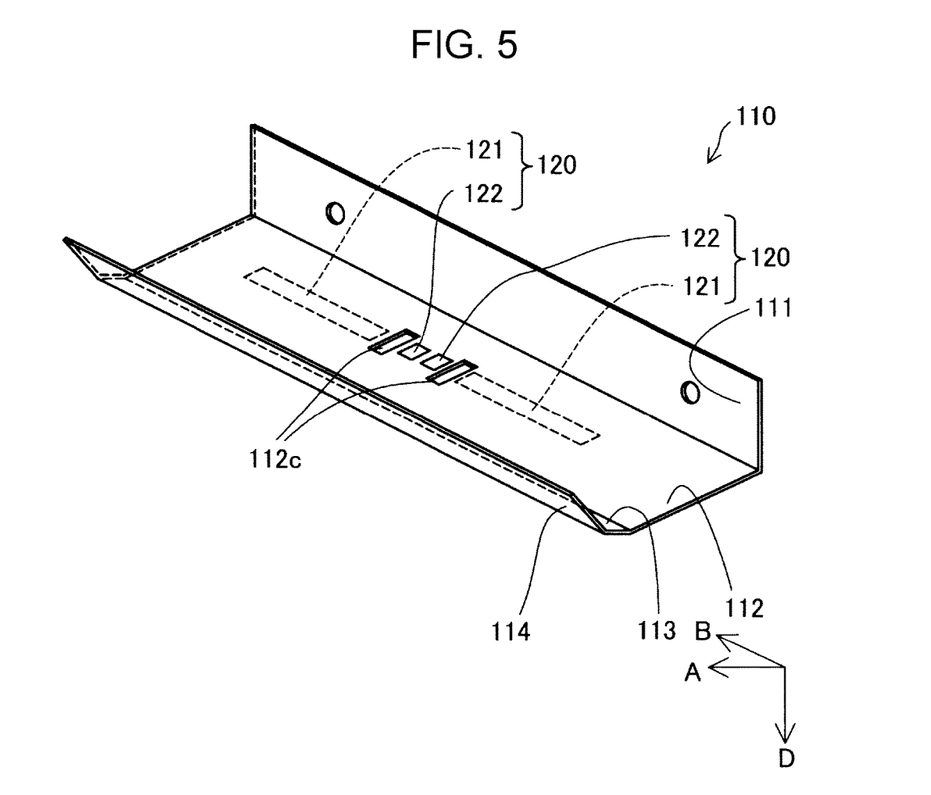
FIG. 5 is an explanatory view illustrating the outline of a foreign object detection plate included in the detection unit in perspective view.
Figure 6:
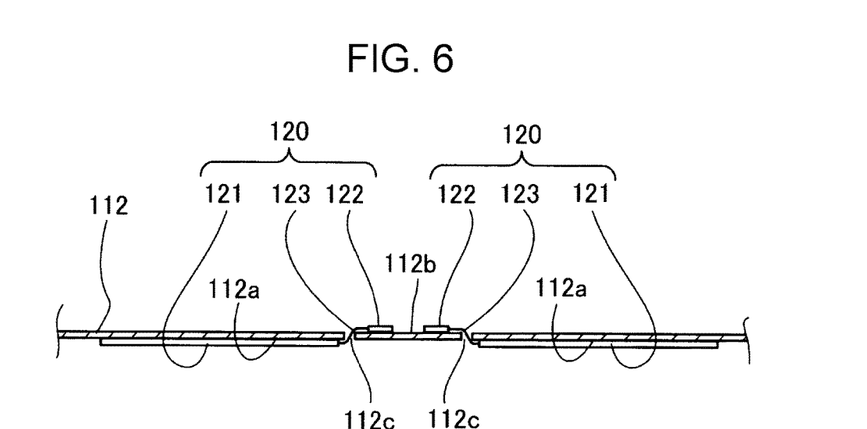
FIG. 6 is an explanatory view illustrating the disposition of a piezoelectric film sensor taken along a line VI-VI in FIG. 4.

Next, the configuration of the detection unit 100 will be described. FIG. 3 is an explanatory view illustrating the configuration of the detection unit 100 by sectioning the detection unit 100 along a line III-III of FIG. 2. FIG. 4 is an explanatory view illustrating a configuration of the detection unit 100 in the ejection direction D in plan view of the detection unit 100 in a direction from an upper cover 100C to the platen 3. FIG. 5 is an explanatory view schematically illustrating a foreign object detection plate 110 included in the detection unit 100 in perspective view. FIG. 6 is an explanatory view illustrating the disposition of piezoelectric film sensors 120 taken along a line VI-VI in FIG. 4. Further, in FIG. 3, in order to ensure visibility, hatching that indicates a member cross section has been omitted.

As illustrated in FIG. 4, the detection unit 100 includes the foreign object detection plate 110 surrounded by a frame 100F, and the piezoelectric film sensors 120 for detecting an foreign object are provided on the foreign object detection plate 110. As illustrated in FIG. 3, the frame 100F is fixed to the carriage 11 by bolts 130 and holds the foreign object detection plate 110 on the upstream side of the recording head 12 in the transport direction A while surrounding the foreign object detection plate 110.

In the detection unit 100, the upper cover 100C is fixed to the upper end of the frame 100F with a bolt (not illustrated) to protect the foreign object detection plate 110 from the upper surface side of the plate. In addition, in the detection unit 100, a lower cover 100H is fixed to the lower end of the frame 100F with bolts 133, and the foreign object detection plate 110 is protected from the lower surface side of the plate. The upper cover 100C and the lower cover 100H are provided for each of the detection units, and by arranging the four of the detection units 100 in line, the foreign object detection plate 110 is protected from the upper and lower surface sides over the entire region in the intersecting direction B.

The foreign object detection plate 110 is a single plate material and corresponds to a detection plate portion that detects the presence of an object such as a foreign object that may come into contact with the nozzle forming surface F of the recording head 12 with movement of the recording head 12 or transportation of the medium P, wrinkles, folds, or tears formed on the medium P, and the medium P itself which has risen. In FIG. 3, these objects are depicted as a foreign object S. Detection of a foreign object will be described later.

The foreign object detection plate 110 for detecting a foreign object includes a first plate portion 111, a second plate portion 112, a third plate portion 113, and a fourth plate portion 114 that are continuous with one another. In this embodiment, in order to secure rigidity for shape maintenance and reliable strain induction upon detection of a foreign object (to be described later), the foreign object detection plate 110 is a plate material shaped and formed by subjecting a stainless steel plate of about 0.2 to 0.5 mm to press forming. Further, the foreign object detection plate 110 may be formed of a plate material such as aluminum or titanium. In addition, engineering plastics such as polyamide, polycarbonate or the like which can secure rigidity and induce reliable strain may be used for the foreign object detection plate 110, or these plastics may be formed as an integral molded article or the like.

The first plate portion 111 is fixed to the frame 100F over the entire surface thereof with bolts 131 and nuts 132, and holds the second plate portion 112 and the third plate portion 113, which are continuous, in a cantilever shape. Here, note that the cantilever shape refers to a state in which the foreign object detection plate 110 is fixed to the frame 100F only at one end portion (the first plate portion 111 in FIG. 4) of the foreign object detection plate 110 in a direction intersecting the extending direction of the nozzle rows (the transport direction A in FIG. 4), and the other end portion of the foreign object detection plate 110 is not fixed but is a free end. In addition, the first plate portion 111 is fixed to the carriage 11 via the frame 100F at a position separated from the recording head 12 housed in the carriage 11.

The second plate portion 112 is a mounting target portion of the piezoelectric film sensor 120, which will be described later, and has opening portions 112c. The second plate portion 112 bends from the first plate portion 111 toward the recording head 12 and is arranged diagonal to the medium P. A formed angle θ (refer to FIG. 3) between the second plate portion 112 and the medium P is 25°. In this case, the formed angle θ between the second plate portion 112 and the medium P is not limited as long as the formed angle θ is 30° or less, and is determined depending on the size of the detection unit 100 along the transport direction A, the minimum size of the foreign object to be detected, required detection sensitivity and the like.

The third plate portion 113 is bent and continuous from the second plate portion 112 and faces the medium P leaving a gap between the third plate portion 113 and the medium P. More specifically, the third plate portion 113 is a plate portion parallel to the medium P, and has a width of 3 mm along the transport direction A. The gap with the medium P is specified in accordance with the size of the smallest foreign object to be detected; in the embodiment, the foreign object detection plate 110 is fixed to the frame 100F at the first plate portion 111 in such a manner that the gap between the third plate portion 113 and the medium P is set to 0.5 to 2.0 mm. The fourth plate portion 114 is bent from and continuous with the third plate portion 113 and is bent toward a side away from the medium P.

The piezoelectric film sensors 120 are provided as two units on the above-mentioned second plate portion 112, and each includes a detection film portion 121 and an output circuit portion 122 that are connected by a plate wiring 123. The detection film portion 121 is formed in a rectangular shape and includes a piezoelectric element which causes a voltage change corresponding to the strain of the second plate portion 112 and outputs the voltage change of the piezoelectric element to the output circuit portion 122 via the plate wiring 123. The output circuit portion 122 converts the voltage change of the detection film portion 121 into an electric signal corresponding to the strain of the second plate portion 112 and outputs the electric signal. The detection film portion 121 of the piezoelectric film sensor 120 of this embodiment has a voltage change characteristic causing a voltage change to the plus side when a tensile force is applied thereto and is mounted on a first plate surface 112a, which faces the medium P, of the second plate portion 112 by adhesion with an appropriate adhesive. The output circuit portion 122 of the piezoelectric film sensor 120 is mounted on a second plate surface 112b on the rear side of the first plate surface 112a of the second plate portion 112 by adhesion with a suitable adhesive. The detection film portion 121 on the first plate surface 112a is electrically connected through the opening portion 112c formed in the second plate portion 112 to the output circuit portion 122 on the second plate surface 112b via the plate wiring 123. Further, in FIG. 5, illustration of plate wirings 123 are omitted.

As illustrated in FIGS. 4 to 6, the foreign object detection plate 110 has two of the piezoelectric film sensors 120 described above provided on the second plate portion 112 along the intersecting direction B. Each of the detection film portions 121 of the piezoelectric film sensors 120 is mounted on the first plate surface 112a of the second plate portion 112 so that the longitudinal direction thereof is along the width direction of the medium P, that is, along the intersecting direction B in the drawing. Each of the piezoelectric film sensors 120 outputs an electric signal corresponding to the strain occurring in the second plate portion 112 to a control unit 18 to be described later via the output circuit portion 122. The strain of the second plate portion 112 occurs when a foreign object S illustrated in FIG. 3 comes into contact with the foreign object detection plate 110, specifically the second plate portion 112 or the third plate portion 113, and consequently the piezoelectric film sensors 120 output an electric signal at the time of contact with the foreign object. Because each of the piezoelectric film sensors 120 has a sensor configuration in which piezoelectric elements are disposed in a film form, the piezoelectric film sensors 120 detect a slight strain of the second plate portion 112 as a displacement, and then output an electric signal corresponding to the slight strain of the second plate portion 112.

Figure 7:
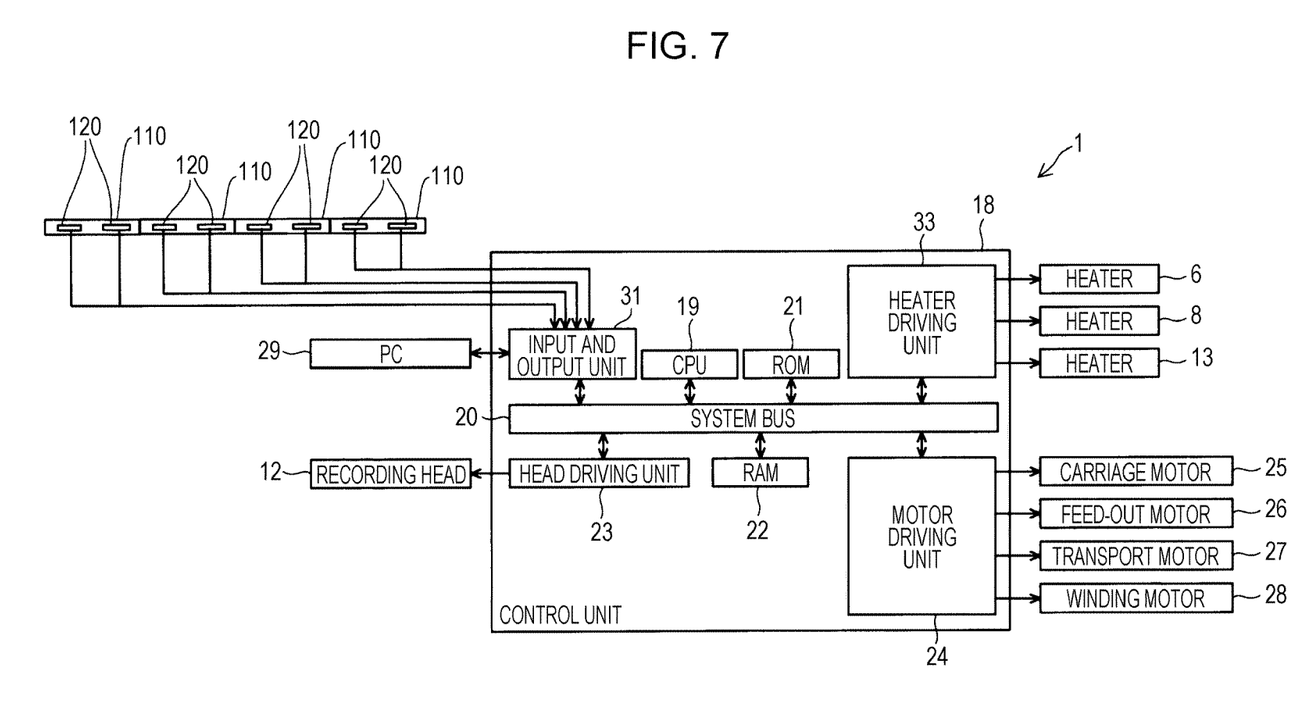
FIG. 7 is a block diagram illustrating an electrical configuration of a recording apparatus according to an embodiment.

Next, the electrical configuration of the recording apparatus 1 of the embodiment will be described. FIG. 7 is a block diagram illustrating an electrical configuration of the recording apparatus 1 according to the embodiment. A CPU 19 controlling the entirety of the recording apparatus 1 is provided in the control unit 18. The CPU 19 is connected, via a system bus 20, to a ROM 21 storing individual control programs and the like that the CPU 19 performs and a RAM 22 that is capable of temporarily storing data.

The CPU 19 is connected, via the system bus 20, to a head driving unit 23 that drives the recording head 12. In addition, the CPU 19 is connected via the system bus 20 to a motor driving unit 24 that drives a carriage motor 25, which moves the carriage 11, a feed-out motor 26, which is a drive source for the setting unit 14, a transport motor 27, which is a drive source for the drive roller 5, and a winding motor 28, which is a drive source for the winding unit 15. In addition, the CPU 19 is connected, via the system bus 20, to a heater driving unit 33 that drives the heater 6, the heater 8 and the heater 13. Furthermore, the CPU 19 is connected to an input and output unit 31 via the system bus 20, and the input and output unit 31 is connected to the two of the piezoelectric film sensors 120 for the foreign object detection plate 110 and a PC 29, which is an external device for inputting recording data and the like to the recording apparatus 1. Further, note that the PC 29 need not be an external device but may be one of the components of the recording apparatus 1.

In the case where the piezoelectric film sensors 120 output an electric signal associated with the strain of the second plate portion 112, the liquid ejecting apparatus 40 according to this embodiment, under the control of the control unit 18, stops ejection of ink by the recording head 12 provided in the carriage 11 and stops relative movement between the medium P and the recording head 12. Further, in the case where the piezoelectric film sensors 120 output an electric signal associated with the strain of the second plate portion 112, a message to the effect that a foreign object has been detected may be displayed on a display unit, or notification may be made by lighting a lamp, sounding a buzzer or the like.

Figure 8:
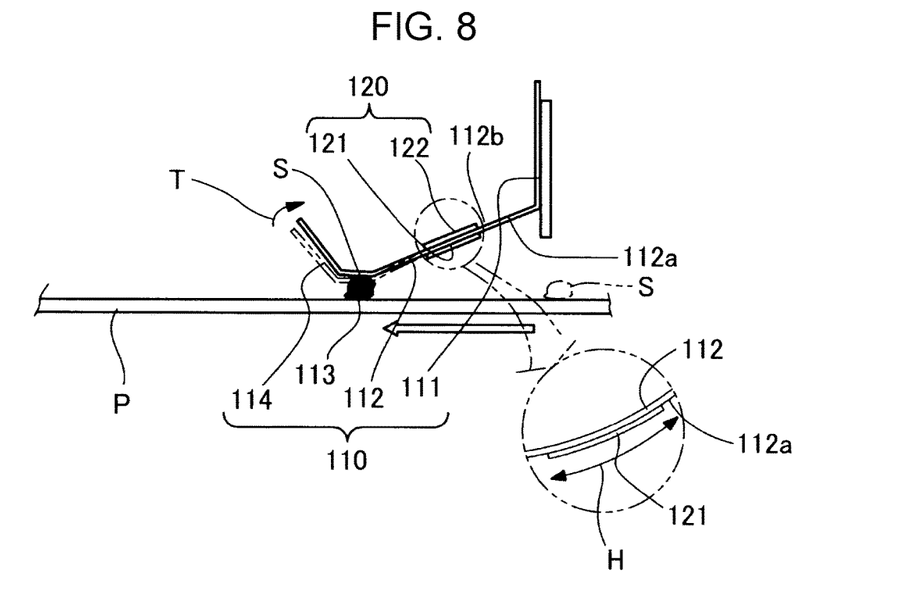
FIG. 8 is an explanatory view schematically illustrating foreign object detection by the foreign object detection plate and the piezoelectric film sensor in an enlarged manner.
Figure 9:
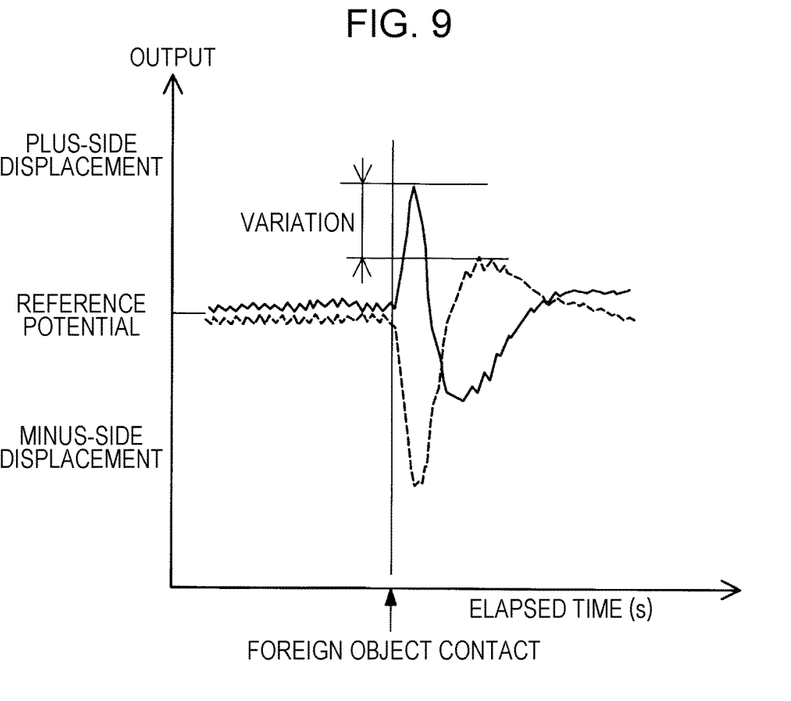
FIG. 9 is an explanatory diagram illustrating foreign object detection accuracy.

The liquid ejecting apparatus 40 of this embodiment, which is described above, detects a foreign object on the surface of the medium in the following manner. FIG. 8 is an explanatory view schematically showing the state of foreign object detection by the foreign object detection plate 110 and the piezoelectric film sensor 120 in an enlarged manner. FIG. 9 is an explanatory diagram illustrating foreign object detection accuracy. As illustrated in FIG. 8, as the medium P is transported, the foreign object S on the surface of the medium P reaches the second plate portion 112 or the third plate portion 113 of the foreign object detection plate 110 and pushes up the second plate portion 112 or the third plate portion 113. With this pushing up, the second plate portion 112 bends and deflects as shown by an arrow T centering around a fixing portion of the first plate portion 111, specifically, a vertical fixing portion with respect to the frame 100F, and consequently strain occurs in the second plate portion 112.

Because this strain occurs with the side of the first plate surface 112a being pulled, a tensile force acts on the detection film portion 121 mounted on the first plate surface 112a as indicated by arrows H. Then, the detection film portion 121 that has been mounted on the first plate surface 112a of the second plate portion 112 transmits a voltage change to the plus side to the output circuit portion 122 based on the voltage change characteristic that a voltage change to the plus side occurs when a tensile force is applied thereto, and the output circuit portion 122 outputs an electric signal corresponding to the strain of the second plate portion 112 to the control unit 18 even if the strain is small. Because the detection film portion 121 receives a tensile force that conforms to the voltage change characteristic of the detection film portion 121, it causes a voltage change with high accuracy. More specifically, the change in the output voltage indicated by the solid line in FIG. 9 refers to the case where the detection film portion 121, which has a voltage change characteristic causing a voltage change toward the plus side when a tensile force is applied thereto, is attached to the first plate surface 112a of the second plate portion 112. The change in the output voltage indicated by the dotted line in FIG. 9 refers to the case where the detection film portion 121, which has a voltage change characteristic causing a voltage change toward the plus side when a tensile force is applied thereto, is attached to the second plate surface 112b of the second plate portion 112. From comparison of these output voltage changes, it has been found that, by mounting the detection film portion 121, which has a voltage change characteristic causing a voltage change to the plus side when a tensile force is applied thereto, on the first plate surface 112a where the tensile force acts upon foreign object detection, as compared with the case where the detection film portion 121, which has a voltage change characteristic causing a voltage change to the plus side when a tensile force is applied thereto, is mounted on the second plate surface 112b of the second plate portion 112, the displacement amount from the reference potential can be improved by about 10%.

When the control unit 18 receives an electric signal associated with the detection of a foreign object from the piezoelectric film sensor 120 and this electric signal is equal to or greater than a threshold value, the control unit 18 stops at least one of the ejection of ink by the recording head 12 and the transportation of the medium P by the transport section 9 (refer to FIG. 1). As a result, in the liquid ejecting apparatus 40 of this embodiment, even without using an optical detection device, it is possible to detect a foreign object S on the medium P with the same degree of accuracy as an optical detection device. In addition, although the foreign object S contacts the first plate surface 112*a* of the second plate portion 112, the foreign object S does not interfere with the output circuit portion 122 on the second plate surface 112*b*. Therefore, according to the liquid ejecting apparatus 40 of this embodiment, in addition to highly accurate foreign object detection, the output circuit portion 122 of the piezoelectric film sensors 120 indispensable for outputting electric signals can be protected from contact with a foreign object. In addition, at the time of detection of the foreign object S on the medium P by the piezoelectric film sensors 120, which have been mounted on the second plate portion 112, the foreign object S has not yet reached the recording head 12 (refer to FIG. 8). Therefore, in the liquid ejecting apparatus 40 of this embodiment, it is possible to suppress damage to the medium P or the recording head 12 caused by contact between the foreign object S and the recording head 12 with a high degree of certainty. In addition, detection of a foreign object S is made based on whether or not the value of the electric signal from the piezoelectric film sensors 120 exceeds a preset threshold value. Therefore, by adjusting the threshold value, the sensitivity of detection of a foreign object S can be adjusted.

In the liquid ejecting apparatus 40 according to this embodiment, for each of the piezoelectric film sensors 120 provided on the second plate portion 112, the detection film portion 121 of the piezoelectric film sensor 120 is formed in a rectangular shape, and the detection film portion 121 is formed so that the longitudinal direction thereof is along the width direction of the medium P. Therefore, the area occupied by the detection film portion 121 along the transport direction A orthogonal to the width direction of the medium P is narrow, and the foreign object detection plate 110 having the second plate portion 112 can be decreased in size.

In the liquid ejecting apparatus 40 according to this embodiment, the first plate portion 111 is fixed to the carriage 11 housing the recording head 12 via the frame 100F. Therefore, for detection of a foreign object S on the medium P, the foreign object detection plate 110 with the piezoelectric film sensors 120 mounted thereon need only be fixed to the carriage 11 via the first plate portion 111 and specific apparatus adjustment and electrical control equipment are not necessary. As a result, according to the liquid ejecting apparatus 40 of this embodiment, it is possible to simplify the adjustment of the mechanical device while improving the accuracy of detection of a foreign object S.

In the liquid ejecting apparatus 40 of this embodiment, the first plate portion 111 is fixed apart from the recording head 12 on the upstream side in the transport direction A, and the second plate portion 112, as illustrated in FIG. 3, is continuous from the first plate portion 111 toward the recording head 12. In this way, because the third plate portion 113 bent from the second plate portion 112 is positioned on the side of the recording head 12, the size of the apparatus along the transport direction A of the medium P can be reduced.

In the liquid ejecting apparatus 40 according to this embodiment, the entire area of the foreign object detection plate 110 is covered with the upper cover 100C. Therefore, in the liquid ejecting apparatus 40 of this embodiment, accidental damage of the foreign object detection plate 110 can be avoided even if a foreign object such as a pen or an ink cartridge drops onto the foreign object detection plate 110 from above the foreign object detection plate 110. In addition, the liquid ejecting apparatus 40 of this embodiment covers the second plate portion 112 with the lower cover 100H on the side of the medium P further upstream than the second plate portion 112 in the transport direction A. Therefore, in the liquid ejecting apparatus 40 of this embodiment, even in the case where the foreign object S on the medium P approaches the foreign object detection plate 110, specifically the second plate portion 112, as the medium P is transported, it is possible to avoid inadvertent damage to the second plate portion 112.

As illustrated in FIG. 3, in the liquid ejecting apparatus 40 of this embodiment, the fourth plate portion 114 is bent from the third plate portion 113 and toward a side away from the medium P. Therefore, according to the liquid ejecting apparatus 40 of this embodiment, even when the medium P rises at the position of the detection unit 100 when the medium P is transported in a direction opposite to the transport direction A illustrated in FIG. 3, because the medium P being reversely transported is pushed down by the fourth plate portion 114, transport jam of the medium being reversely transported can be suppressed by the fourth plate portion 114. Further, the foreign object detection plate 110 illustrated in FIG. 3 may be formed in a shape which is line symmetrically inverted with respect to the vertical line. That is, the second plate portion 112 may be continuous with and bent from the first plate portion 111 toward the upstream side of the recording head 12 in the transport direction A. In this case, a foreign object S can be guided to the third plate portion 113 by the fourth plate portion 114. In addition, in this case, the attachment position of the first plate portion 111 is not limited to the frame portion on the upstream side of the frame 100F in the transport direction A illustrated in FIG. 3 and may be attached to the frame portion on the downstream side of the frame 100F in the transport direction A opposite to the frame portion on the upstream side of the frame 100F in the transport direction A.

In the liquid ejecting apparatus 40 of this embodiment, the third plate portion 113 is bent from the second plate portion 112 so as to be parallel with the medium P being transported. Therefore, in the liquid ejecting apparatus 40 of this embodiment, in the case where the recording head 12 housed in the carriage 11 moves relative to the medium P in the transport direction A, the possibility of damage to the medium P caused by contact of the third plate portion 113 with the medium P can be suppressed compared with the case where the third plate portion 113 is bent from the second plate portion 112 in an acute angle shape protruding downward. Further, there is no problem even if the third plate portion 113 is bent from the second plate portion 112 in a downwardly convex acute angle.

In the liquid ejecting apparatus 40 according to this embodiment, four of the detection units 100 are mounted and fixed on the carriage 11, and detection of a foreign object on the medium P having the maximum width that the recording apparatus 1 can deal with is possible. Each of the four detection units 100 is merely fastened to the carriage 11 via the frame 100F by bolt tightening. Therefore, in the liquid ejecting apparatus 40 of this embodiment, if any malfunction of foreign object detection occurs in any of the detection units 100, it is possible to easily replace the detection unit 100 that is malfunctioning, and the malfunction can be recovered from easily and promptly. In addition to this, in the liquid ejecting apparatus 40 of this embodiment, the foreign object detection plate 110 is fixed to the frame 100F by merely tightening the bolts in each of the four of the detection units 100. Therefore, by simply removing the upper cover 100C of the detection unit 100 which has malfunctioned and replacing the foreign object detection plate 110 itself of the detection unit 100 which has malfunctioned, easy and quick recovery from the malfunction is possible.

The liquid ejecting apparatus 40 of this embodiment includes four of the detection units 100 facing divided regions obtained by dividing the medium P as a target of foreign object detection along the width direction thereof. Therefore, the liquid ejecting apparatus 40 has the following advantages. For example, if a foreign object S exists on the right end side in the width direction (intersecting direction B) of the medium P illustrated in FIG. 2, the rightmost one of the detection units 100 in FIG. 2 facing a divided region on the right end in the width direction emits an electric signal from the piezoelectric film sensors 120 which is larger than each of electric signals of the detection units 100 corresponding to the other divided regions. The same is true when the foreign object S exists on the left end side in the width direction of the medium P illustrated in FIG. 2 or when the foreign object S exists on the right side of the width direction center or on the left side of the width direction center. Therefore, according to the liquid ejecting apparatus 40 of this embodiment, by comparing the magnitudes of the electric signals output from the four of the detection units 100, it is possible to determine at which position in the width direction of the medium P a foreign object S exists.

In the liquid ejecting apparatus 40 of this embodiment, each of the four units of the detection units 100 includes two piezoelectric film sensors 120 on the second plate portion 112 along the intersecting direction B (refer to FIGS. 4 and 5). Therefore, the accuracy of detection of a foreign object is enhanced.

Figure 10:
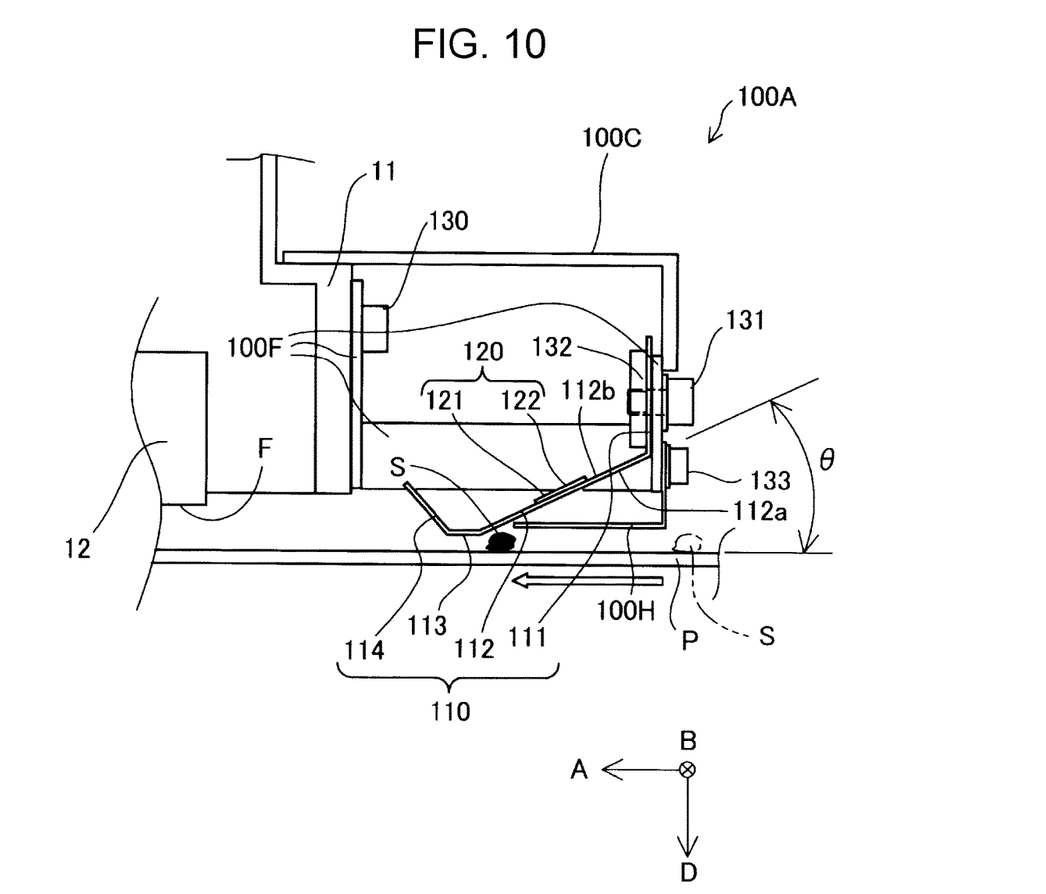
FIG. 10 is an explanatory diagram illustrating a configuration of a detection unit according to another embodiment by sectioning the detection unit.
Figure 11:
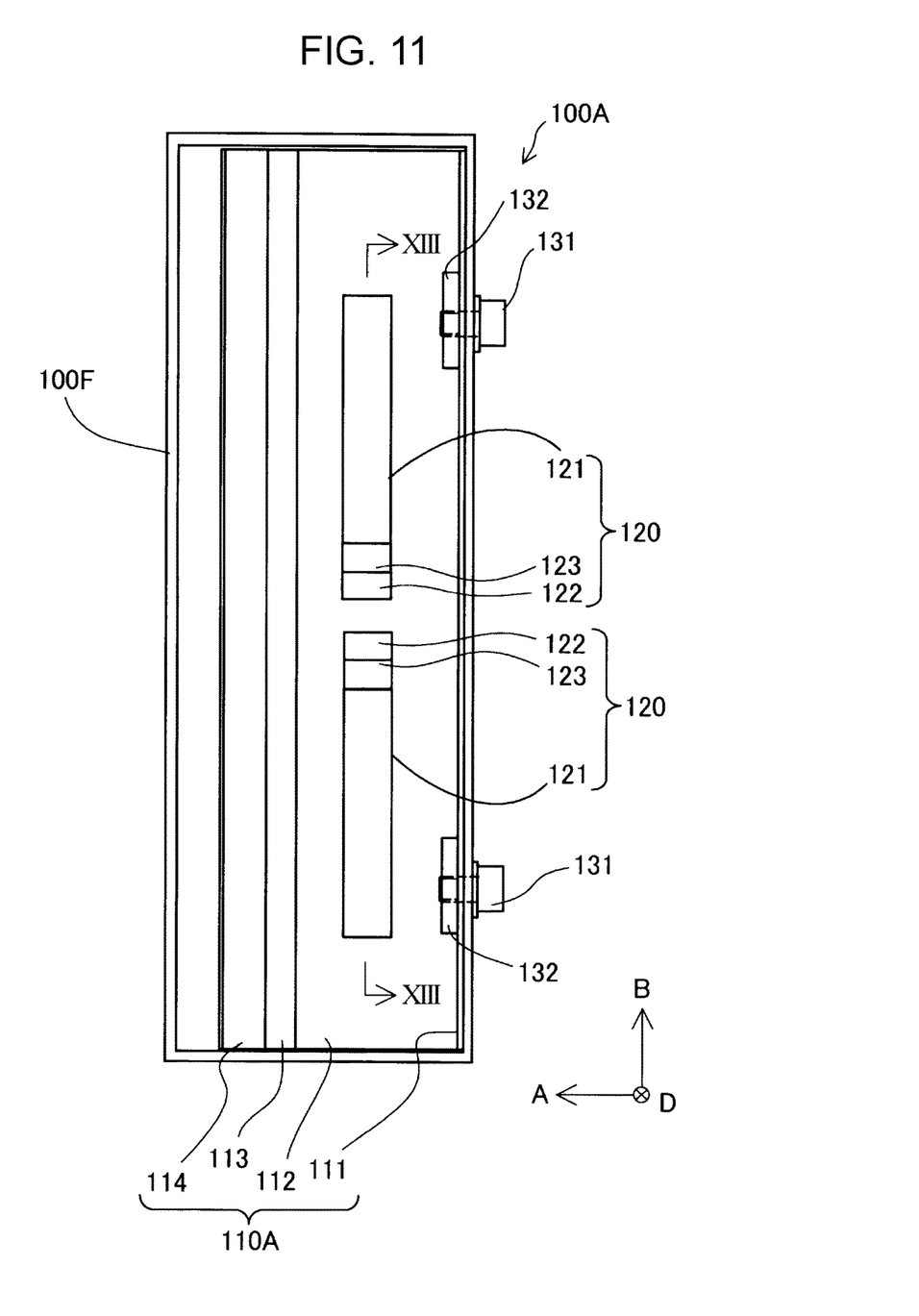
FIG. 11 is an explanatory view illustrating a configuration of a detection unit in an ejection direction in a plan view of the detection unit in a direction from an upper cover to a platen.
Figure 12:
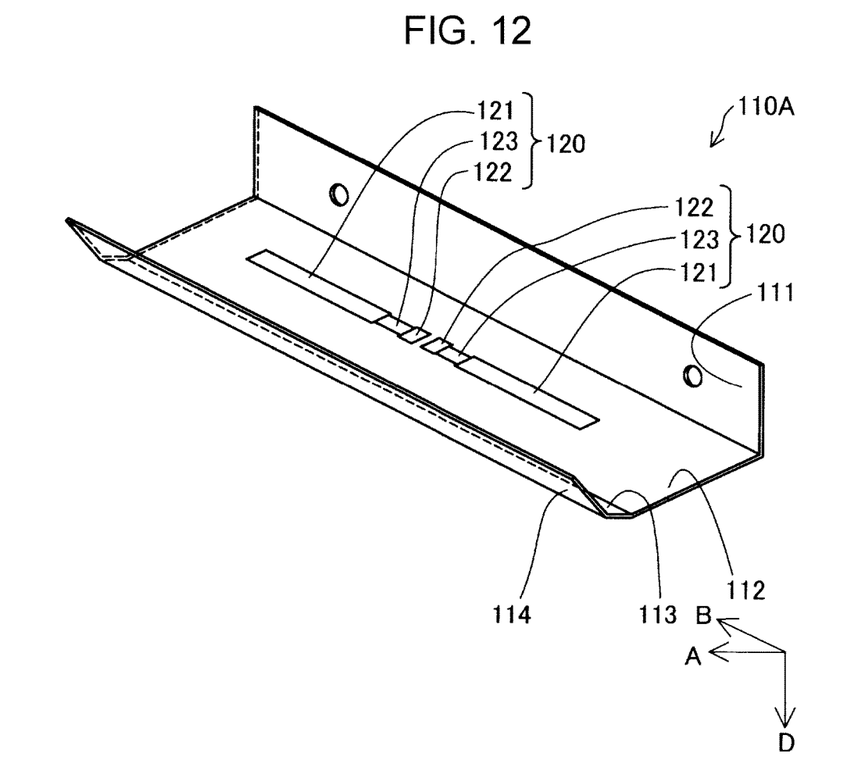
FIG. 12 is an explanatory view illustrating the outline of a foreign object detection plate included in the detection unit in perspective view.
Figure 13:
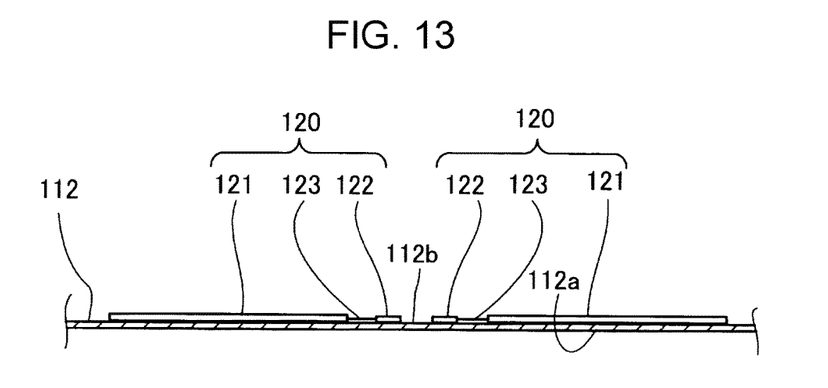
FIG. 13 is an explanatory view illustrating the disposition of a piezoelectric film sensor taken along a line XIII-XIII in FIG. 11.

FIG. 10 is an explanatory diagram illustrating a configuration of a detection unit 100A according to another embodiment by sectioning the detection unit 100A. FIG. 11 is an explanatory view illustrating a configuration of the detection unit 100A in the ejection direction D in plan view of the detection unit 100A in a direction from the upper cover 100C to the platen 3. FIG. 12 is an explanatory view schematically illustrating a foreign object detection plate 110A included in the detection unit 100A in perspective view. FIG. 13 is an explanatory view illustrating the disposition of the piezoelectric film sensors 120 taken along a line XIII-XIII in FIG. 11. Further, in FIG. 10, in order to ensure visibility, hatching that indicates a member cross section has been omitted.

In the detection unit 100A of this embodiment, the characteristics of the detection film portion 121 of the piezoelectric film sensors 120 and the mounting surface based on these characteristics are different. The detection film portion 121 of the detection unit 100A has a voltage change characteristic causing a voltage change to the plus side when a compressive force is applied. The detection film portion 121 is mounted on the second plate surface 112b on the rear surface side of the first plate surface 112a facing the medium P by adhesion with an appropriate adhesive and electrically connected to the output circuit portion 122 via the plate wiring 123. Because both the detection film portion 121 and the output circuit portion 122 are mounted on the second plate surface 112b in this way, the second plate portion 112 does not have the opening portions 112c.

In the liquid ejecting apparatus 40 of this embodiment having the detection unit 100A, upon detection of a foreign object, the second plate portion 112 or the third plate portion 113 is pushed up by the foreign body S, and consequently the second plate portion 112 is distorted such that the second plate surface 112b side is compressed. Therefore, a compressive force acts on the detection film portion 121 attached to the second plate surface 112b. Then, based on the voltage change characteristic that a voltage change to the plus side occurs when a compressive force is applied, the detection film portion 121 that has been mounted on the second plate surface 112b of the second plate portion 112 transmits the voltage change to the plus side to the output circuit portion 122 and the output circuit portion 122 outputs an electric signal corresponding to the strain of the second plate portion 112 to the control unit 18 even if the strain is small. Because the detection film portion 121 receives a compressive force that conforms to the voltage change characteristic of the detection film portion 121, it causes a voltage change with high accuracy (see FIG. 9). As a result, even with the liquid ejecting apparatus 40 of this embodiment having the detection unit 100A, it is possible to achieve both highly accurate foreign object detection and protection of the output circuit portion 122 of the piezoelectric film sensor 120. In addition, because the detection film portion 121 is provided on the second plate surface 112b that does not come into contact with the foreign object S, the detection film portion 121 can also be protected.

The invention is not limited to the above-described embodiments and modification examples, and can be realized in various configurations without departing from the gist thereof. Technical features in the embodiment corresponding to technical features in each application example described in the summary of the invention, other embodiments, and modification examples may be used to solve some or all of the above-mentioned problems and may be replaced or combined as appropriate in order to achieve some or all of the effects of the invention. In addition, unless technical features are described as essential in this specification, they can be deleted as appropriate.

In the above-described embodiment, the detection film portion 121 is formed in a rectangular shape, but it may have a shape other than a rectangular shape. In addition, for each of the detection film portions 121 provided on the second plate portion 112, the detection film portion 121 is made orthogonal to the transport direction of the medium P so that the longitudinal direction thereof is along the width direction of the medium P, but the detection film portion 121 may be arranged along the transport direction of the medium P or may intersect the transport direction.

In the above-described embodiment, the foreign object detection plate 110 is fixed to the carriage 11 via the frame 100F; however, the frame 100F may be provided on the upstream side of the recording head 12 in the transport direction separately from the carriage 11, and the foreign object detection plate 110 may be fixed to the frame 100F. That is, the foreign object detection plate 110 may be provided independently of the carriage 11. Besides this, the foreign object detection plate 110 may be fixed by housing the frame 100F itself in the carriage 11, or by forming the frame 100F with the frame body of the carriage 11.

In the embodiment described above, the first plate portion 111 is made to be separate from the recording head 12 and the second plate portion 112 is made to continue toward the recording head 12; however, the second plate portion 112 may be continued from the first plate portion 111 on the side away from the recording head 12, that is, toward the upstream side in the transport direction.

In the embodiment described above, the formed angle $\theta$ between the second plate portion 112 and the medium P is set to 25°; however, the formed angle $\theta$ between the second plate portion 112 and the medium P may be 30° or less, and a formed angle $\theta 1$ between the second plate portion 112 and the first plate portion 111, which is vertically fixed, may be more than 90° and not more than 120°.

In the above-described embodiment, the fourth plate portion 114 is bent from the third plate portion 113 on the side away from the medium P; however, the fourth plate portion 114 may be omitted or the cross section of the free end of the third plate portion 113 may be arcuate.

In the above-described embodiment, the third plate portion 113 is parallel to the medium P, but may be curved toward the medium P side.

In the above-described embodiment, as illustrated in FIG. 4, the third plate portion 113 extends in the width direction of the medium P along the intersecting direction B; however, the third plate portion 113 may extend diagonally to the intersecting direction B and in the width direction of the medium P.

In the above-described embodiment illustrated in FIG. 4, the detection film portion 121 having a voltage change characteristic causing a voltage change to the plus side when a tensile force is applied thereto is mounted on the first plate surface 112a of the second plate portion 112; however, the detection film portion 121 may be mounted on the second plate surface 112b on the rear surface side of the first plate surface 112a facing the medium P by adhesion with an appropriate adhesive and electrically connected to the output circuit portion 122 via the plate wiring 123. In this case, however, the control unit 18 determines whether there is a foreign object depending on whether or not the value of the electric signal from the piezoelectric film sensor 120 is lower than a preset threshold value. As illustrated in FIG. 9, in the case where the detection film portion 121 having a voltage change characteristic causing a voltage change toward the plus side when a tensile force is applied thereto is mounted on the second plate surface 112b of the second plate portion 112, because the voltage change characteristic causes a voltage change to the minus side at the time of foreign object detection, the detection film portion 121 that has been mounted on the second plate surface 112b transmits a voltage change to the minus side to the output circuit portion 122 when a compressive force is applied to the detection film portion 121, and the output circuit portion 122 outputs an electric signal corresponding to the strain of the second plate portion 112 to the control unit 18. Because the detection film portion 121 receives a compressive force that conforms to the voltage change characteristic of the detection film portion 121, it causes a voltage change with high accuracy (see FIG. 9). As a result, highly accurate foreign object detection and protection of the output circuit portion 122 of the piezoelectric film sensor 120 can be achieved at the same time. In addition, because the detection film portion 121 is provided on the second plate surface 112b that does not come into contact with the foreign object S, the detection film portion 121 can also be protected. Also in this case, because both the detection film portion 121 and the output circuit portion 122 are mounted on the second plate surface 112b in this way, the second plate portion 112 does not have the opening portions 112c.

This application claims priority under 35 U.S.C. § 119 to Japanese Patent Application No. 2017-058631, filed Mar. 24, 2017. The entire disclosure of Japanese Patent Application No. 2017-058631 is hereby incorporated herein by reference.

What is claimed is:

1. A liquid ejecting apparatus comprising:
a liquid ejecting unit that is arranged to face a medium and that ejects a liquid onto the medium;
a detection plate portion that is plate shaped and that undergoes strain by coming into contact with an object that can come into contact with the liquid ejecting unit with relative movement between the medium and the liquid ejecting unit; and
a piezoelectric film sensor that is provided on the detection plate portion and that outputs an electric signal corresponding to the strain of the detection plate portion, wherein
the piezoelectric film sensor includes a detection film portion in which a piezoelectric element that causes a voltage change corresponding to the strain is arranged and an output circuit portion that converts the voltage change of the detection film portion into an electric signal and outputs the electric signal, and
the output circuit portion is provided on a second plate surface of the detection plate portion, the second plate surface being a rear surface of a first plate surface, which faces the medium, of the detection plate portion.

2. The liquid ejecting apparatus according to claim 1, wherein
the detection film portion has a voltage change characteristic causing a voltage change to a plus side when a tensile force is applied to the detection film portion, and
the detection film portion having the voltage change characteristic is provided on the first plate surface of the detection plate portion and electrically connected to the output circuit portion on the second plate surface via an opening portion formed in the detection plate portion.

3. The liquid ejecting apparatus according to claim 1, wherein
the detection film portion has a voltage change characteristic causing a voltage change to a plus side when a compressive force is applied to the detection film portion, and
the detection film portion having the voltage change characteristic is provided on the second plate surface of the detection plate portion and electrically connected to the output circuit portion on the second plate surface.

4. The liquid ejecting apparatus according to claim 1, wherein
the detection film portion has a voltage change characteristic causing a voltage change to a minus side when a compressive force is applied to the detection film portion, and
the detection film portion having the voltage change characteristic is provided on the second plate surface of the detection plate portion and electrically connected to the output circuit portion on the second plate surface.

5. The printing apparatus according to claim 1, wherein the detection film portion is formed in a rectangular shape and is provided on the detection plate portion so that a longitudinal direction thereof is along a width direction of the medium.

* * * * *